United States Patent

[11] 3,581,212

| [72] | Inventor | William McMurray<br>Schenectady, N.Y. |
|---|---|---|
| [21] | Appl. No. | 846,354 |
| [22] | Filed | July 31, 1969 |
| [45] | Patented | May 25, 1971 |
| [73] | Assignee | General Electric Company |

[54] FAST RESPONSE STEPPED-WAVE SWITCHING POWER CONVERTER CIRCUIT
18 Claims, 13 Drawing Figs.

[52] U.S. Cl................................................ 328/14,
328/147, 328/186, 328/187, 321/15, 307/243, 307/246
[51] Int. Cl........................................................ H03b 7/14
[50] Field of Search........................................... 328/14, 186, 187; 307/252, 243, 246; 321/15

[56] References Cited
UNITED STATES PATENTS

| 3,100,851 | 8/1963 | Ross et al...................... | 328/186X |
| 3,207,974 | 9/1965 | McMurry....................... | 307/252X |
| 3,398,349 | 8/1968 | Evans et al..................... | 307/252X |
| 3,510,782 | 5/1970 | Ralph et al..................... | 328/14 |

Primary Examiner—John S. Heyman
Attorneys—John F. Ahern, Paul A. Frank, Donald R. Campbell, Frank L. Neuhauser, Oscar B. Waddell and Joseph B. Forman ABSTRACT: To obtain fast response to a cyclical AC or variable DC input reference signal by a stepped-wave power converter circuit comprising a plurality of equal or unequal inverter modules connected in series or parallel so that the module output voltages add algebraically, the composite instantaneous output stepped-wave voltage is compared with the instantaneous voltage values of the limits of a control band placed about the reference signal. One or more inverter modules are switched to produce a step change whenever the composite output voltage is outside the control band limits. An application is a fast response switching power amplifier for driving sonar transducers.

Inventor:
William McMurray.
by Thomas R. Campbell
His Attorney.

CONTROL SEQUENCE I

CONTROL SEQUENCE II

CONTROL SEQUENCE III

Inventor:
William McMurray,
by Donald R. Campbell
His Attorney.

FAST RESPONSE STEPPED-WAVE SWITCHING POWER CONVERTER CIRCUIT

This invention relates to fast response stepped-wave power conversion circuits such as power amplifiers, and more particularly to solid state power converters comprising a plurality of inverter modules arranged in the form of a stepped-wave inverter that is controlled in an improved manner so as to respond rapidly to changes in a reference signal. This is accomplished by effectively placing a control band about the input reference signal and selectively switching in and out the inverter modules whenever their additive output falls outside the limits of the control band.

Certain power circuit applications such as a power supply for driving a sonar transducer require small, efficient power amplifiers which are capable of accurately tracking an amplitude-modulated and frequency-modulated input signal in the frequency range of 1—10 kHz. Class B amplifiers are inefficient and do not meet these requirements. Various approaches that require at some point the generation of a higher frequency waveform than the maximum output frequency of 10 kHz. in general cannot be implemented with the power semiconductor devices presently available because this is close to or exceeds their switching capability. One such circuit that merits careful consideration is a cycloconverter, that is, a circuit for producing a low frequency AC voltage when supplied from a higher frequency source without the need for a DC link between the source and load. From a practical standpoint, the supply frequency that can be employed is limited by the turnoff time of the thyristors, and thus the frequency ratio between the supply frequency and the output frequency will be low. Cycloconverters produce excessive phase jitter when the frequency ratio is low, resulting in poor tracking and instability despite their ability to respond to command changes almost instantaneously. Moreover, there is the possibility of interaction between the AC supply and the cycloconverter due to low frequency modulation effects of the load on the supply, and also of excessive higher frequency harmonics in the output. As another possible choice, multiple pulse-width modulated inverters must be ruled out because these inverters generate many equal width or variable width pulses on each half cycle of the operating frequency, and clearly require a switching frequency that is beyond the capability of available semiconductor devices at the high end of the desired operating frequency range. Inverters of this type are described generally in Chapter 8 of the book "Principles of Inverter Circuits" by Bedford and Hoft, John Wiley and Sons, Inc., copyright 1964, Library of Congress Catalog Card No. 64-20078. Finally, approaches that require an output transformer are unsatisfactory because the variable reactance of the output transformer over the specified frequency band is incompatible with the closed loop feedback control used to implement the circuit. In this situation the probability of servo loop instability is high.

As has been mentioned, a method of controlling a stepped-wave inverter circuit configuration has been devised to permit the use of these switching power circuits as fast response power converters such as power amplifiers. The known techniques for controlling stepped-wave inverters do not allow the output to accurately track random changes in the input signal. Polyphase stepped-wave inverters wherein each phase is a square wave inverter are commonly employed to reduce the harmonic content of the output. In this case the output is predetermined, and the semiconductor switching times are programmed on a fixed schedule to eliminate selected harmonics or optimize the waveform. Most desirably this is accomplished by an all-digital control circuit, comprising for instance a master clock oscillator supplying pulses to a ring counter or an array of flip-flops to produce precise phase angle positions on the composite output wave. When output voltage control is also required, the conventional control circuit combines digital and analog techniques. Master phase positions are obtained in a similar digital manner and used to derive operating phase positions by means of smoothly adjustable phase shift proportional to a DC voltage analog signal that determines the duration of the steps and therefore the magnitude of the output voltage. There is a delay of up to one-half cycle in response to a change in the DC voltage signal since it cannot change the position of a step that has already occurred. The DC voltage signal is generally obtained by rectifying and filtering the inverter output voltage, comparing it with a reference, and deriving the error voltage which serves as the phase shift control voltage. The response of such a system to a change in the reference voltage is relatively slow. In variable frequency stepped-wave inverters, a voltage-controlled oscillator used for the clock can be synchronized with a reference frequency signal by means of a phase-locked loop, but this is also relatively slow in response. The response limitations of these techniques for controlling stepped-wave inverters, by way of summary, prohibits their use in a power amplifier for driving variable reactance loads such as sonar transducers where accurate reproduction of the magnitude and phase of a reference signal is required even though the reference possesses a high degree of amplitude and frequency modulation. Although some modifications can be made in such control circuits to improve their response, this does not appear to be feasible while maintaining stability.

Accordingly, an object of the invention is to provide new and improved switching power converter circuits constructed in a stepped-wave inverter circuit configuration to produce a stepped-wave output that responds rapidly to changes in an input reference signal.

Another object of the invention is to provide a new control band method for controlling stepped-wave inverters to achieve fast and accurate response to an input signal over a broad range of frequencies.

Yet another object is the provision of a new power amplifier suitable for amplifying a highly modulated electrical waveform and capable of driving a sonar transducer or similar loads.

In accordance with the invention, a fast response stepped-wave power converter circuit for an input varying DC reference signal or cyclical AC reference signal comprises a plurality of equal or unequal inverter modules each having at least two different discrete output voltages of equal magnitude and opposite polarity. The inverter modules are connected together as a stepped-wave inverter in a series or parallel arrangement such that the composite stepped-wave output voltage is the algebraic sum of the individual module output voltages. Control and logic means are provided for selectively switching the inverter modules to produce a composite output voltage that is a desired function of the reference signal. More particularly, the control and logic means comprises means for generating control band limits that are placed about the reference signal and have instantaneous values differing from the instantaneous reference signal by predetermined amounts. Usually the control band limits are symmetrical with the reference signal. The instantaneous values of the composite output voltage and each control band limit are effectively compared with one another and logic means derives gating signals to change the individual output voltage of one or more inverter modules and produce a step change in the composite output voltage when the instantaneous composite output voltage departs from the range between the control band limits or a value related thereto. A new method for controlling a stepped-wave inverter circuit of this type is based on these concepts.

The foregoing and other objects, features, and advantages of the invention will be apparent from the following more particular description of several preferred embodiments of the invention, as illustrated in the accompanying drawings wherein.

Figure 5A:
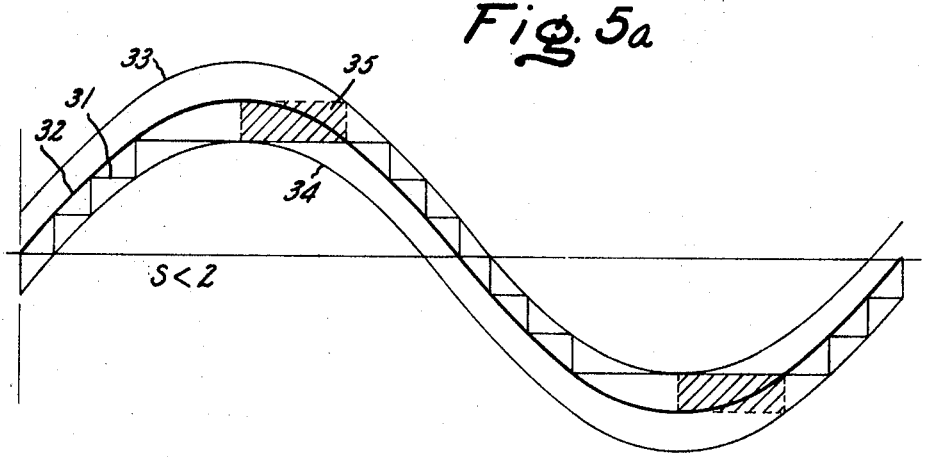
Figure 5B:
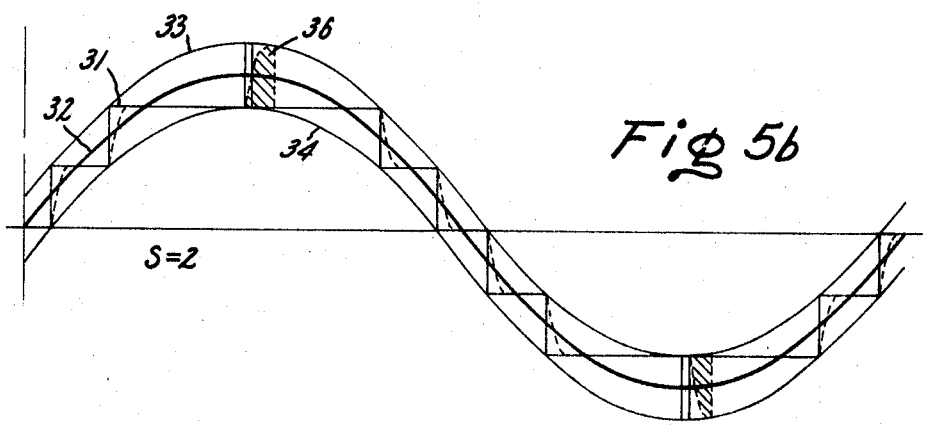
Figure 5C:
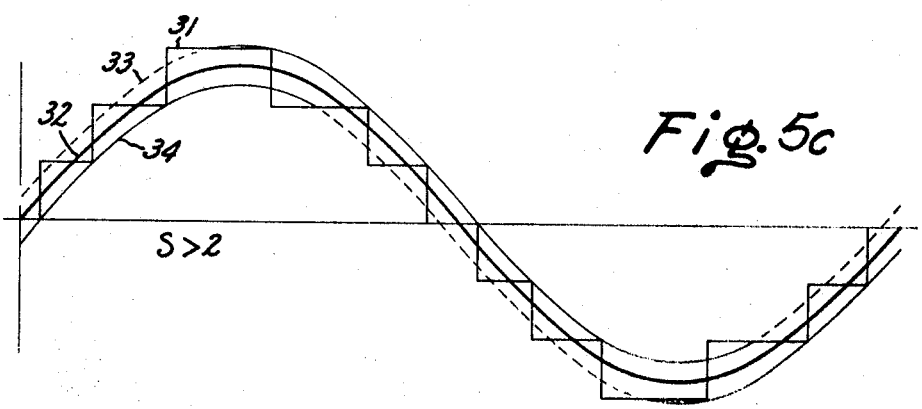
Figure 6A:
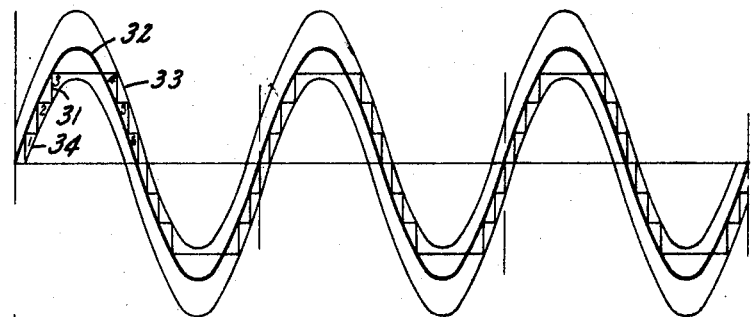
Figure 6B:
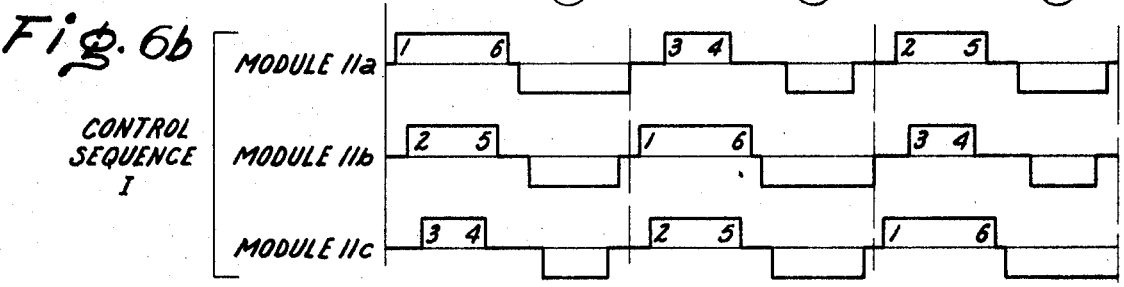
Figure 6C:
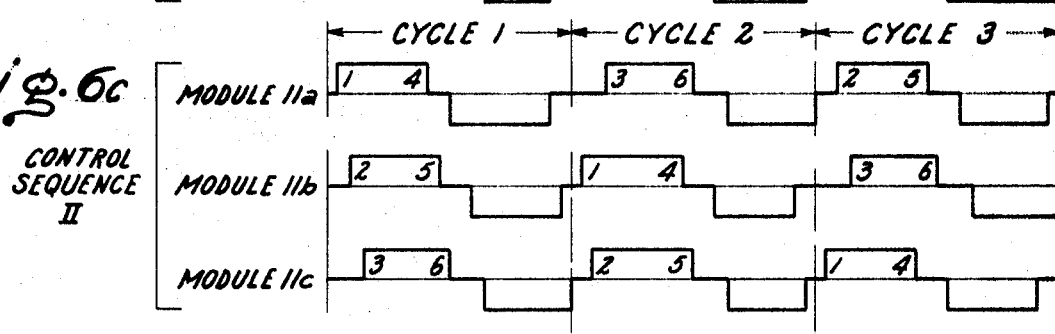
Figure 6D:
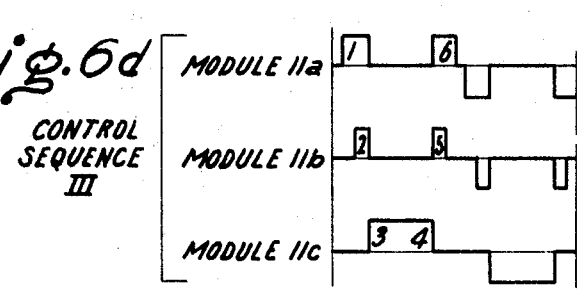
Figure 7:
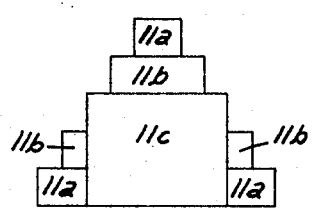
Figure 8:
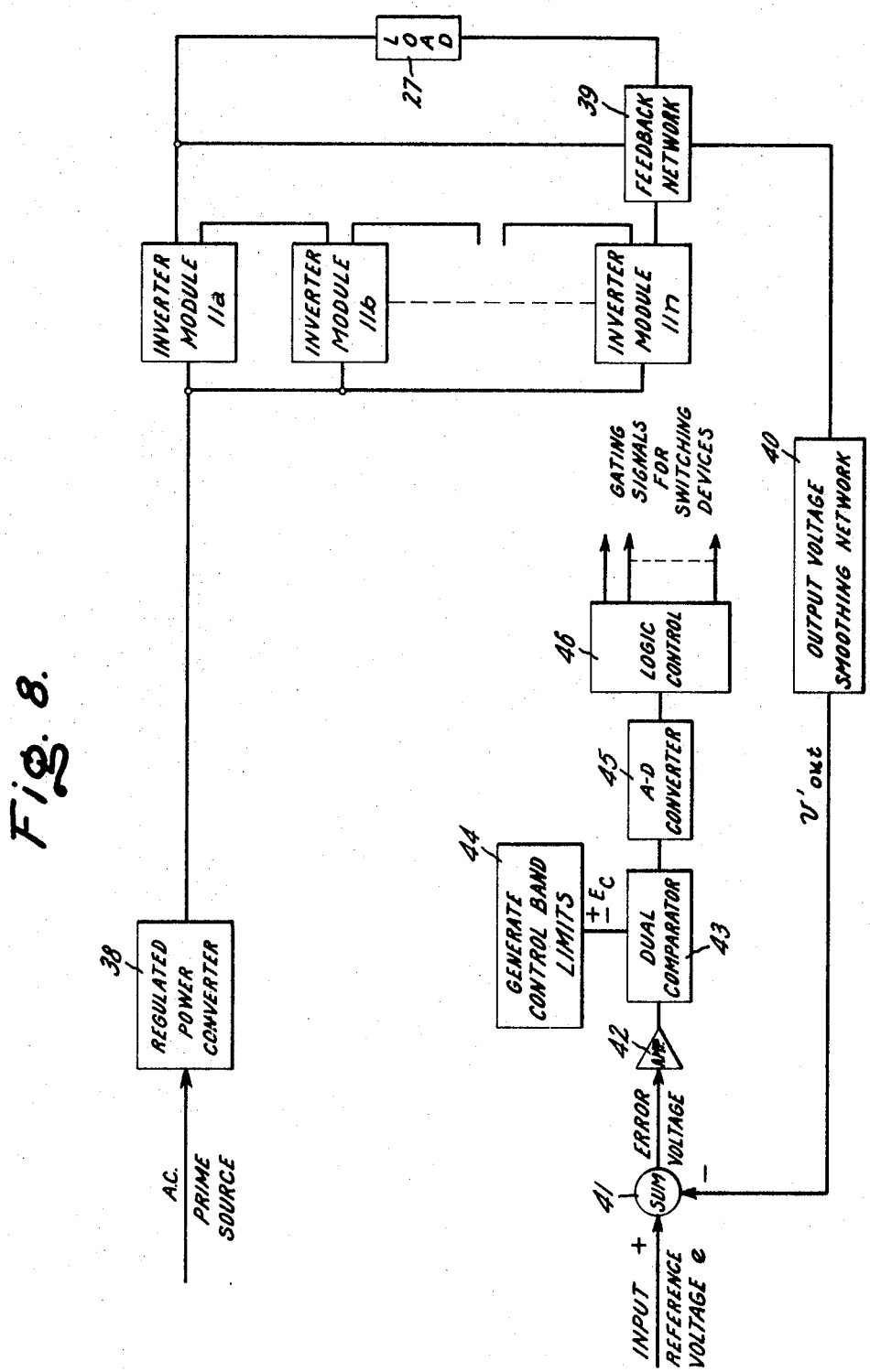

FIGS. 5a, 5b, and 5c show the effect of the step level or magnitude upon the output stepped waveform for three values, $s<2$, $s=2$, and $s>2$, with respect to the value of semicontrol band $E_c$;

FIG. 6a illustrates a sine wave reference signal and the stepped-wave output voltage for a stepped-wave inverter comprising three inverter modules;

FIGS. 6b—6d each show timing diagrams for the three inverter modules illustrating the polarity and time duration of the output of each of the modules when the circuit is operated respectively according to three different control methods;

FIG. 7 is a sketch of the composite output voltage of three unequal modules showing their advantage in producing a sine wave output; and FIG. 8 is a simplified block diagram of a switching power amplifier construction in accordance with the invention illustrating in particular the basic features of the circuitry for controlling the inverter modules.

The stepped-wave power converter circuits constructed and controlled in the manner to be discussed can be used in any application or to perform any function that requires accurate and faithful tracking of a varying DC signal or a cyclical AC signal. The reference signal furthermore can be either a voltage reference or a current reference signal proportional to either the desired output voltage or the desired output current respectively. By way of example, the invention is explained with regard to a small, efficient power amplifier for driving sonar transducers and amplifying a frequency and amplitude modulated voltage reference signal having a frequency range of about 1 to 10 kHz. However, the circuit is equally useful for instance as a voltage regulator.

The switching power amplifier to be described produces a stepped waveform generated by multiple inverter modules that are selectively controlled to have a composite output determined by the limits or boundaries of a control band effectively placed about the input signal. In the well-known manner of a stepped-wave inverter, the sum of the individual inverter module square wave outputs is a plurality of discrete voltage levels obtained by varying the combination and polarity of the inverter modules contributing to the output. When the composite output signal is outside the control band limits, or equals or exceeds one of the limits in a given direction, the output is indexed by switching in or out one or more of the inverter modules so that the new composite output is again within the limits. Before proceeding to a discussion of suitable stepped-wave inverter circuits that can be employed to practice the invention, the new control method will be reviewed briefly with reference to FIG. 1.

Figure 1:
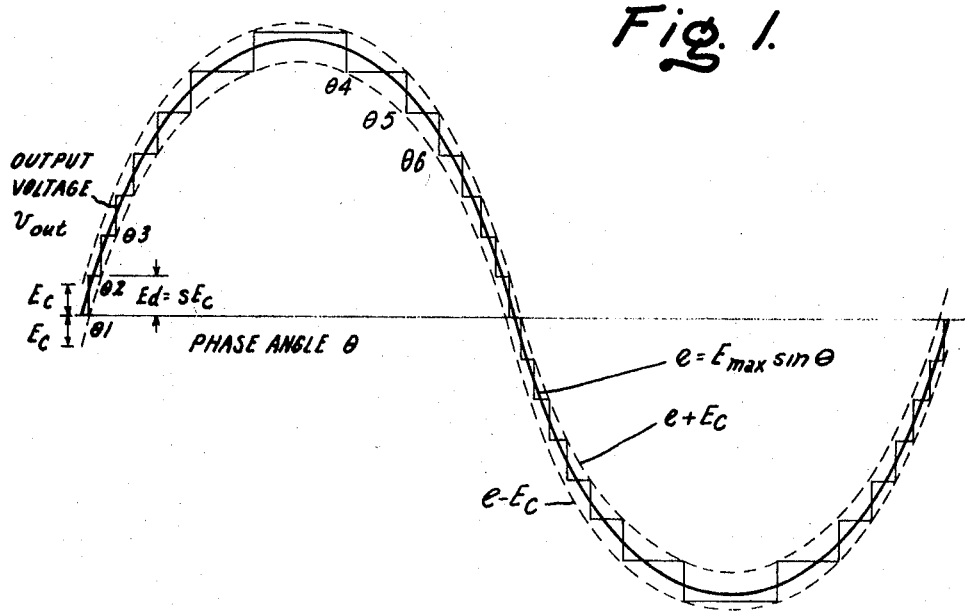
FIG. 1 shows a sine wave reference voltage waveform on which is superimposed the output stepped waveform produced by the switching power amplifier circuit constructed in a stepped-wave inverter configuration and operated according to the teaching of the invention.

In FIG. 1, the input reference signal $e$ is an audio frequency sine wave, i.e., $e=E_{max} \sin \theta$. In order to provide a control band placed about the input reference signal $e$, a constant voltage $E_c$ is added to and subtracted from the input reference voltage $e$, establishing two voltage levels $e+E_c$ and $e-E_c$ with which the output voltage $v_{out}$ is compared. So long as the output voltage remains within the range of the control band or dead-band $2E_c$ about the input signal $e$, no change in output is made. When the input signal increases so that the lower control band limit $e-E_c$ would become higher than the output voltage, the control circuitry of the stepped-wave inverter produces a positive step increase in the output voltage, normally again positioning the output voltage within the control band limits. Similarly, when the input reference signal decreases so that the upper control band limit $e+E_c$ would become lower than the output voltage, then a negative step change is made in the output voltage. Assuming that the output voltage is initially at the zero level in FIG. 1, the output voltage remains unchanged until the lower control band limit $e-E_c$ is also at the zero level. At angle $\theta 1$, the control circuitry of the stepped-wave inverter produces a positive step voltage increase $E_d$ whose value is assumed to be less than $2E_c$. The new output voltage at the first step level thus lies within the control band limits, and the output voltage at the new level in turn remains unchanged until the angle $\theta 2$, at which time another positive step increase $E_d$ is made in the output voltage. The process continues at the angle $\theta 3$ and the succeeding angles until the input reference voltage $e$ enters the second quadrant and begins to decrease. The output voltage at that point remains unchanged until the input reference signal decreases to the point where the upper control band limit $e+E_c$ would be lower than the output voltage. At the angle $\theta 4$ the control circuitry of the step wave inverter produces a negative step decrease $E_d$ in the output voltage again positioning the output within the control band limits, assuming that all step increases or decreases are equal. Further step decreases in the output voltage are made at the angles $\theta 5$ and $\theta 6$, etc. On the second half cycle the control method is similar. During the third quadrant the step decreases in the output voltage occur when the output voltage intersects the upper control band limit, and during the fourth quadrant step increases in output voltage occur when the instantaneous output voltage intersects the lower control band limit.

Although the new method of controlling a stepped-wave inverter has been discussed with regard to a sinusoidal input reference voltage $e$, it will be understood that the control method has general applicability to other waveforms. The method is likewise applicable to a range of frequencies, but as was previously mentioned, becomes particularly advantageous when the upper limit of the frequency range to be amplified is at the limit of the capability of switching power semiconductors. At the present time this is about 10 kHz. Several variations in the general control technique will be obvious to those skilled in the art and will be mentioned in greater detail later. For instance, the two semicontrol band voltages $E_c$, instead of being equal to one another as here illustrated, can be unequal. The voltage $E_c$ can also vary in some predictable manner with respect to the input reference voltage signal $e$, rather than being constant. While there are some applications in which it is desirable that the step levels $E_d$ in output voltage be equal to one another, there are other applications in which the step levels can be unequal, or in which there are two or more step levels, each a multiple of a unit step level. The magnitude of the semicontrol band voltage $E_c$ and the height of the voltage step level $E_d$ is a function of the number of steps desired, and this in turn is dependent on the phase and amplitude tolerances on the output with reference to the input. The voltage step level $E_d$ is an integer or fraction $s$ of the semicontrol band voltage $E_c$, and the effect of changing $s$ will be discussed in greater detail later.

Figure 2:
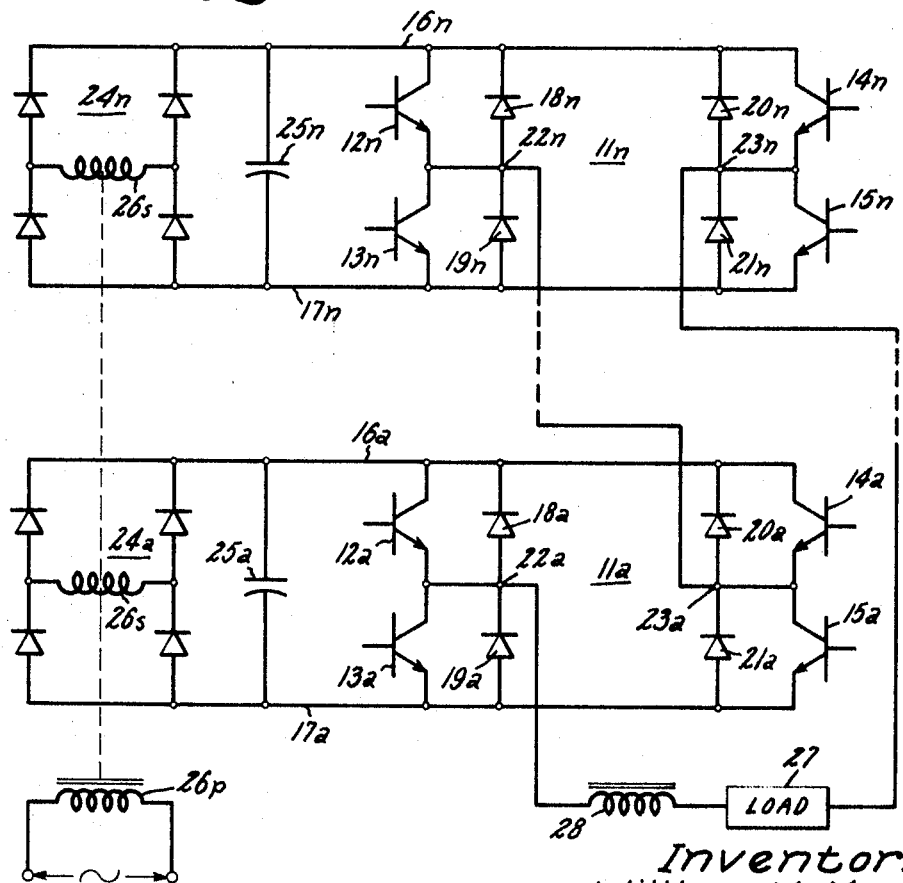
FIG. 2 is a schematic circuit diagram of a stepped-wave inverter according to one embodiment of the invention in which the inverter modules are connected in series with one another, wherein the dashed lines indicate repeating modules not illustrated.

A preferred form of stepped-wave inverter appropriate to be operated by the control band method is illustrated in FIG. 2. In this embodiment of the invention, the individual inverter modules are identical and produce equal voltage step changes $E_d$, and the individual modules are effectively connected in series circuit relationship with one another. Only two inverter modules 11a and 11n are shown by way of illustration, however there is no theoretical limitation to the maximum number of inverter modules. In an actual circuit, the number of inverter modules employed is determined by the required number of voltage step levels, assuming each voltage step to be equal. Inverter module 11a is constructed in the full bridge circuit configuration with NPN transistors as the power switching devices. More particularly, module 11a comprises a first pair of series connected transistors 12a and 13a, and a second pair of series connected transistors 14a and 15a etc., in turn connected between a pair of DC power supply terminals 16a and 17a. Feedback diodes 18a—21a, useful to carry reactive current when the load is a nonunity power factor load, are respectively connected across the emitter-collector of each power transistor. Junction points 22a and 23a between the respective pairs of devices and their feedback diodes are the output terminals of the module. Each module has an isolated DC power supply so that the output terminals of the inverter bridges 11a, 11n, etc., can be directly connected in series across the load. Conveniently, the independent power supply for module 11a comprises a conventional full wave diode bridge rectifier 24a having a filter capacitor 25a connected between its output terminals. Its input terminals are connected across the secondary windings 26s of the input rectifier transformer. The AC power supply for the primary winding 26p is a standard 60 Hz. or 400 Hz. source, or can be a high frequency (10 kHz., for example) inverter in order to reduce the size of the transformer.

Inverter module 11n is identical to inverter module 11a, and corresponding elements are designated by the same reference numerals with an "n" suffix. To connect the outputs of the individual modules directly in series with the load 27 and a filter 28, if required, output terminal 23a is coupled to output terminal 22n, and the series combination of load 27 and filter 28 is coupled between the remaining output terminals 22a and 23n. In general, the right-hand output terminal of an inverter module is connected to the left-hand output terminal of the next inverter module, and so on through the series, and the load 27 is coupled between the remaining output terminals of the first and last modules in the series. With the series arrangement of modules shown in FIG. 2, the output voltage appearing across the load 27 is the algebraic sum of the voltages produced by each of the individual inverter modules. This avoids the need for a set of output transformers, which may become large if the output frequency is relatively low. In the event that there are a large number of modules contributing to the output voltage, it also is preferable to use a separate input transformer 26p for each of the modules, instead of a single transformer with multiple windings as here illustrated.

Figure 3:
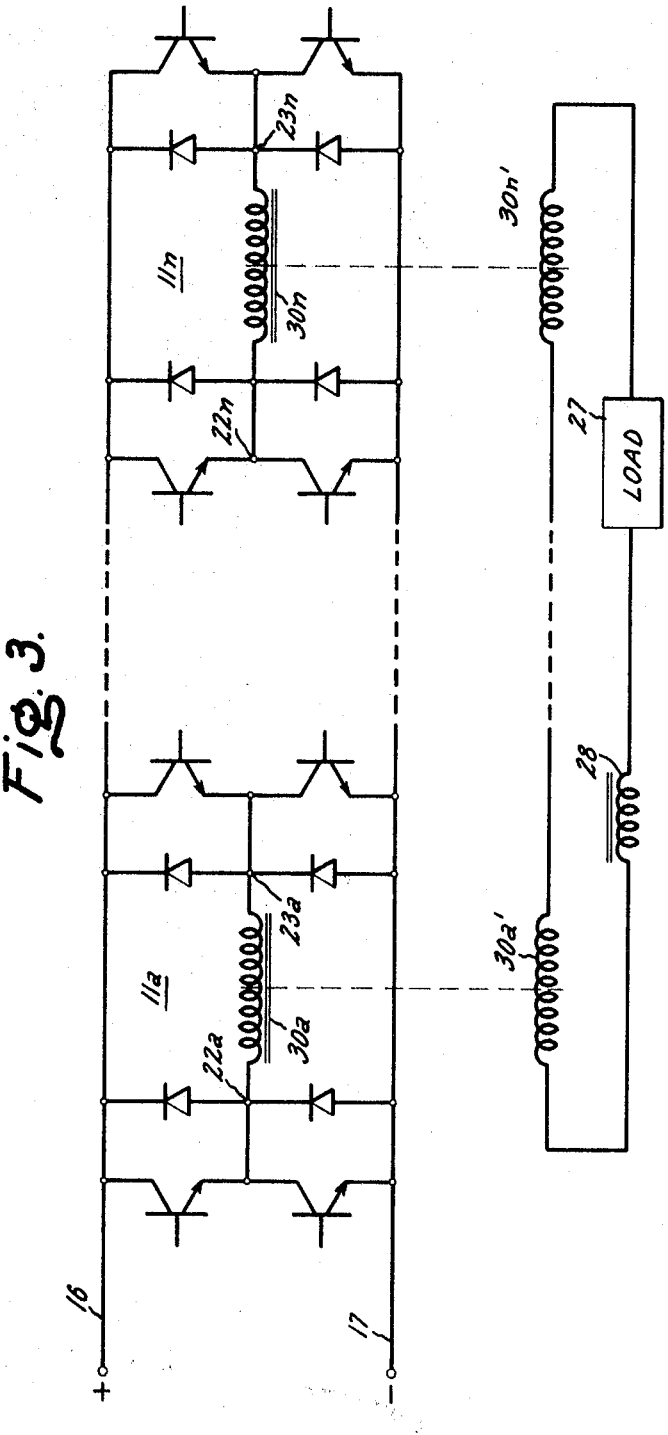
FIG. 3 is similar to FIG. 2 but shows another embodiment of the stepped-wave inverter having inverter modules connected in parallel.

Referring to FIG. 3, in a second preferred form of the stepped-wave inverter suitable to be operated by the control band method, the inverter modules 11a, 11n, etc., are effectively connected in parallel circuit relationship with one another between a common pair of DC supply terminals 16 and 17. The individual inverter modules are identical to those in FIG. 2 with the exception that the output primary transformer winding 30a or 30n is connected between the output terminals of the respective modules. The secondary output transformer windings 30a', 30n', etc., are connected in series circuit relationship with one another and with the load 27 and filter 28. In this way, the voltage appearing across the load and filter is the algebraic sum of the individual voltages induced in the several module output transformers. This arrangement is preferred when the minimum requirement frequency is relatively high, since the output transformers can then be quite small. With this circuit, the DC supply connected between input terminal 16 and 17 is a battery or can be obtained by rectification of an AC prime source. Other factors, such as the magnitudes of the prime supply and load voltages relative to the rating of available semiconductor switching devices, may also affect the selection of circuit configuration.

Many other variations in the circuitry of the inverter modules are also possible. Instead of using NPN transistors as the power switching semiconductors, they may be replaced by other suitable solid state switching devices such as PNP transistors, gate turnoff thyristors, or ordinary silicon controlled rectifier thyristors with added commutating circuits. Instead of being constructed as bridge-type inverters, the modules may embody other inverter circuit configurations such as the half-bridge or the center-tapped output transformer configurations. The individual input rectifiers in FIG. 2 can be replaced by other standard connections such as the half bridge or doubler, the center-tapped arrangement, or a polyphase rectifier.

Figure 4:
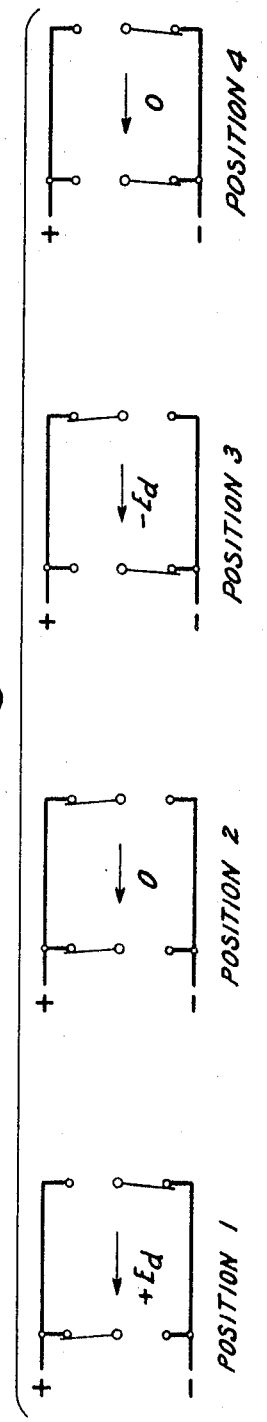
FIG. 4 is a series of diagrams illustrating the four switch positions of a bridge inverter.

For each of the bridge modules in FIG. 2 or FIG. 3, there are four possible combinations of the semiconductor switch positions, as shown in the four sketches comprising FIG. 4, wherein the arrows indicate a reference positive direction. Position 1 produces an output of $+E_d$, where $E_d$ is equal to the DC supply voltage. Position 3 gives an output of $-E_d$, while positions 2 and 4 both result in zero voltage output. The sequence of positions 1, 2, 3, 4, or the reverse, produces the well-known quasi-square waveform of a simple pulse-width modulated inverter. By algebraically adding in series the individual outputs of the separate inverter modules, which are appropriately controlled in pulse width and phase position in the manner to be described in greater detail hereinafter, there results a progressively increasing or decreasing output stepped voltage waveform. This is, of course, the desired output waveform (see FIG. 1). When the inverter modules are constructed with only two series connected switching semiconductors, such as when the half-bridge or center-tapped inverter circuit configurations are used, only the voltage levels $+E_d$ and $-E_d$ can be obtained. An even number of these types of modules must be used if a zero output voltage level is desired, or if the bridge module is operated such that only switch positions 1 and 3 are used, obtained by opposing the outputs of one-half of the modules against the other half.

With reference to the sinusoidal reference signal $e$ in FIG. 1, it is seen that when the input signal is at a voltage zero crossing, all of the inverter modules are in switch positions 2 or 4 so that the composite output is zero, or, if any are in position 1, then an equal number are in position 3. At angle $\theta 1$ the lower control band limit $e-E_c$ is also at the zero level, and a step increase $E_d$ is produced in the composite output by switching one of the modules from zero to positive output (position 2 or 4 to position 1 in FIG. 4) or from negative to zero output (position 3 to position 2 or 4). At angle $\theta 4$, at which the upper control band limit $e+E_c$ would become lower than the composite output voltage, and a negative step decrease in the output voltage is called for, one of the inverter modules is switched from positive to zero output (position 1 to position 2 or 4), or from zero to negative output (position 2 or 4 to position 3).

The effect on the switching power amplifier system of changing the step size relative to the magnitude of the control band is illustrated in FIG. 5. As was mentioned, the step level $E_d$ and the semicontrol band $E_c$ are related by the expression $E_d = sE_c$. FIG. 5a shows a typical output voltage produced when the multiplying factor $s$ is less than 2. In this diagram $s$ is approximately 1. For $s<2$, the fundamental component of the stepped-wave output voltage 31 lags the reference input voltage 32. Even allowing for some errors in the control system or other parts of the switching power amplifier, it is clear that when the reference voltage 32 is rising, the stepped-wave output voltage 31 never intersects the upper control band limit 33. By similar reasoning, the stepped-wave output 31 never intersects the lower control band limit 34 in the second and third quadrants when the input reference voltage 32 is decreasing. At the peak of the reference wave 32, the lower control band limit 34 becomes tangent to the output voltage 31, and the decision to switch another module is critical. An infinitesimally small change in either the output or the lower control band limit can produce another step increase or jump discontinuity in output as indicated by the shaded block 35 in FIG. 5a.

For $s=2$, FIG. 5b, the fundamental component of the output voltage 31 is in phase with the reference signal 32 and the problem of unwanted jump discontinuity at the peak of the sine wave is theoretically eliminated. When a step increase is made at the peak of the sine wave by switching in a module, the new output level immediately intersects the upper control band limit 33, and a step decrease is made by switching a module out again, producing an infinitesimally narrow spike at the peak. As the signal amplitude increases further, the spike rapidly widens into a regular step, and although the gain of this system rises steeply, there is ideally no jump discontinuity. In practical control systems, however, some discontinuity will probably occur. One way to minimize the problem is to filter the vertical portions of the stepped output wave 31 as shown in dashed lines in FIG. 5b to round the corners of the wave and avoid the possibility of intersecting the opposite control band limit immediately after a step is made. Filtering of this type is needed particularly if transient overshoot spikes are present. When such filtering is employed and a step increase is made at the peak of the reference sine wave 32, a jump discontinuity in output is produced as indicated by the hatched line block 36. However, the magnitude of the discontinuity is much less than in FIG. 5a so that the condition $s=2$ is considered to be optimum. Instead of filtering the stepped wave output voltage, the control logic can introduce a minimum time delay after a step change is made before another step increase or decrease is permitted, and this will have a generally similar effect on system behavior as is produced by filtering the output wave. Alternatively, a value of $s$ between 1 and 1 can be chosen, preferably nearer 2, to allow the use of a relatively simple control system with a minimum amount of phase shift and jump discontinuity in the output wave produced.

It is evident from FIG. 5c that the selection of $s>2$ requires a modification of the control band method of operation of a stepped-wave inverter circuit. In this figure $s$ is approximately 3. In order to avoid the problem presented when the output voltage 31 rises above the level of the upper control band limit 33, the upper control band limit signal 33 can be suppressed or displaced upward when the reference voltage 32 has a positive slope. To the same effect, the lower control band limit 34 is suppressed or displaced downward when the slope is negative. The stepped waveform shown in FIG. 5c can then be produced. The fundamental of this stepped output voltage leads the input reference voltage 32. Appropriate suppression or displacement of the control band limit signals may also be desirable when operating with $s=2$ (in addition to or instead of the filtering or time delay techniques previously described), since drifts in relative voltage levels may cause $s$ to vary above or below the nominal value of 2 by a small amount.

There are, of course, limitations on the range of the amplitude of the input reference signal $e$ relative to the magnitude of the voltage step level $E_d$ and the number of inverter modules selected for a particular switching power amplifier and the maximum voltage all the modules can produce. When the maximum input reference voltage $e$ is less than the semicontrol band $E_c$, then the input reference voltage is always within the range of the control band, and no output is produced. On the other hand, when the input reference voltage is higher than can be obtained by adding the outputs of all the modules in a manner producing the maximum output magnitude, then saturation results and the peaks of the input reference signal waves cannot be reproduced or amplified.

In selecting the details of the control circuitry and logic for determining the sequence of switching "in" and "out" the inverter modules of the stepped-wave inverter operated by the control band method to obtain fast response of the stepped-wave output to the input reference signal, it will be realized that there is a wide range of possible choices for selecting from all available modules that one which should be used to produce a particular voltage step. When generating a positive step increase, for example, those modules already switched to produce a positive voltage output are obviously not available. Theoretically, any of the remaining modules presently producing zero or negative voltage may be selected at random, and should result in uniform load distribution over a sufficiently long period. The random selection approach may even have the advantage of avoiding specific subharmonic loading patterns which may result in objectionable beats. It is preferable, however, to select the modules to be switched in a logical sequence that can be implemented with reasonably simple control circuitry.

Two suitable control sequences for selecting modules are given in the timing diagrams of FIGS. 6b and 6c for the case of a stepped-wave inverter comprising three modules 11a, 11b, 11c, capable of producing the three-step output waveform illustrated in FIG. 6a. Either method is appropriate for the series arrangement of inverter modules in FIG. 2 or the parallel arrangement in FIG. 3.

In each half cycle a total of six step changes are required to track an input sinusoidal wave as indicated by numerals 1—6 on the positive half cycles only of the stepped-wave output voltage 31 in FIG. 6a. In FIGS. 6b—6d, the corresponding numerals 1—6 are placed on the square wave outputs of the three modules to indicate the step change that is produced by switching in or switching out that particular module. The operation during the negative half cycles is analogous. In control sequence I, FIG. 6b, the inverter modules are selected on a first-in, last-out basis. That is, modules 11a, 11b, and 11c are switched to their positive output position in sequence to produce step changes 1, 2, and 3, and remain in these positions. The modules are switched from the positive output position to zero output position in sequence in reverse order to produce step changes 4, 5, and 6. In control sequence II, FIG. 6c, the modules are selected on a first-in, first-out basis. In contradistinction to control sequence I, the modules remain energized at a particular output level for equal amounts of time. In both control sequences I and II, each step level is cyclically rotated from one module to the next. For example, the waveform produced by module 11a in timing cycle 1 is produced by module 11b in cycle 2 and by module 11c in cycle 3. In the general case with $n$ modules a complete rotation is accomplished in $n$-cycles of output and the average load on each module over this period is equalized. The averaging interval is halved by rotating positions each half cycle. For further symmetry, the zero voltage positions of each module should be arranged to alternate between switch positions 2 and 4 in FIG. 4.

One advantage to control sequence II is that it appears to be less discriminatory and produces more equal volt-time areas. However, by using control sequence I, the fundamental components of the voltages produced by each module all have the same phase so that all modules have the same displacement power factor since the same current flows through all. In control sequence II, the voltages are displaced in phase so that each module is subjected to a different power factor. This implies that reactive power circulates from some modules to others, and with highly reactive loading, some modules generate real power. Although the cyclic rotation of step positions still balances the long term loading, the variation in loading will be greater for control sequence II and the efficiency is therefore poorer. For these reasons, it is concluded that control sequence I is preferable.

As has been indicated, other control sequences are possible. Some other general considerations applicable to the design of the control circuitry and logic are as follows. For the series module power circuit of FIG. 2, a practical control arrangement should not require any one module to regenerate power for a long period since the diode rectifier supplies cannot absorb power or return it to the prime source. The load current must flow through two of the eight semiconductor devices in each module, so the total losses are about constant. However, to avoid localized heating where a particular device in a given module carries current for a longer period than the corresponding device in another module, it is desirable to rotate the step positions of the modules. For the parallel module arrangement of FIG. 3, the positive and negative steps produced by each module should be balanced over as short a period as possible, preferably one cycle of the output frequency, so that the transformers will not saturate. In general, it is desirable to distribute the loading uniformly among the modules so that they can all be identical for production and maintenance economy. However, the control circuit may be simplified if the cyclic rotation of the step positions of the modules is omitted and unequal loading is allowed. It is further desirable not to oppose positive and negative modules to produce zero net output, since this implies that one of the modules is unnecessarily regenerating power delivered by the other. These general considerations are satisfied, it will be noted, by control sequences I and II.

Control sequence III illustrated by the timing diagrams in FIG. 6d is included to demonstrate the flexibility in the choice of control sequences and to specifically cover the sequence when the voltage outputs of the individual inverter modules are unequal. By way of example, it is assumed that modules 11a and 11b produce a unit step voltage change, whereas module 11c has an output that is three times the unitary voltage output. To reproduce the sine wave shown in FIG. 6a, module 11a is initially switched from zero to positive output to produce step 1, then module 11b is switched to produce the second step. Only module 11c is required for the third step, and therefore modules 11a and 11b are both switched simultaneously from positive to zero output. For the remaining steps the reverse order is followed, that is, module 11c is switched out as the two modules 11a and 11b are switched in, and for the final steps, modules 11b and 11a are switched out in that order. The particular advantage of using unequal inverter modules is better understood with reference to FIG. 7. A five-step sine wave is reproduced using these same three modules. Steps 1—3 are produced in the same manner as has been described. Steps 4 and 5 are produced by switching in module 11b and then module 11a.

FIG. 8 shows a simplified block diagram of a switching power amplifier including a diagrammatic representation of one form of suitable control and logic circuitry for controlling the inverter modules. Inverter modules 11a—11n are connected in series in the manner of FIG. 2, and regulated power converter 38 supplying power to each of the inverter modules performs the required power conversion if the AC prime source is not connected directly across primary winding 26p of the input rectifier transformer in FIG. 2. In order to sense the stepped output waveform, feedback network 39 comprising an appropriate voltage or current detector is connected directly across the composite output of the inverter modules before any filtering is performed. The feedback signal representative of $v_{out}$ is filtered in an output voltage smoothing network 40 to remove extraneous noise and the like, and is appropriately reduced in magnitude to provide a signal $v'_{out}$ for comparison with the input reference $e$ in a summing circuit 41. The output of summing circuit 41 is an error voltage that is the difference between the input reference voltage $e$ and the feedback signal voltage $v'_{out}$. This error voltage is amplified by amplifier 42 and compared in a dual comparator circuit 43 with the two control band limits generated by circuit 44. Dual comparator circuit 43 produces an output whenever the error voltage exceeds either one of the two control band limits, and this information is utilized by an analog-to-digital converter circuit 45, which may take the form of a reversible counter, to determine the number of steps required for the voltage level to be produced by the inverter modules. Logic control circuit 46 operates in accordance with one of the methods for determining the switching sequence of modules as discussed with regard to FIGS. 6b—6d, and generates the gating signals for the switching devices in inverter modules 11a—11n. The same type of control and logic circuitry can be used for the parallel arrangement of inverter modules of FIG. 3.

In summary, a stepped-wave power converter circuit has been devised to improve the response to changes in a reference signal by the control technique of comparing the instantaneous value of the output stepped waveform with the limits of a control band effectively placed about the reference, and switching one or more of the inverter modules whenever the composite output voltage departs from the range between the control band limits, or substantially equals or exceeds a value related thereto. The inverter modules can have equal or unequal voltage outputs of opposite polarity, and have a third output selection of 0 volts when a bridge module is used. Ordinarily the two control band limits are equal voltages above and below the reference signal, but it is also possible to employ unequal semicontrol band limits or to suppress or displace one of the limits. The fundamental of the stepped-wave output is theoretically in phase with the input reference when the step voltage change is exactly equal to the total control band voltage, and lags or leads the fundamental for other ratios. Various control sequences can be employed to assure some degree of rotation of switching the individual inverter modules.

While the invention has been particularly shown and described with reference to several preferred embodiments thereof, it will be understood by those skilled in the art that various changes in form and details may be made therein without departing from the spirit and scope of the invention.

What I claim as new and desire to secure by Letters Patent of the United States is:

1. A fast response stepped-wave power converter circuit responsive to a variable input electrical reference signal comprising
    a plurality of inverter modules each having at least two discrete output voltages,
    means for connecting together said inverter modules as a stepped-wave inverter so that the composite stepped-wave output voltage is the algebraic sum of the individual module output voltages, and
    control and logic means for selectively switching said inverter modules to produce the composite output voltage as a desired function of the reference signal, wherein said control and logic means comprises
    means for generating control band limits that are effectively arranged about the reference signal and have instantaneous values differing from the instantaneous reference signal by predetermined amounts,
    means for effectively comparing the instantaneous values of the composite output voltage and each control band limit, and
    logic means for deriving gating signals to change the individual output voltage of at least one inverter module and produce a step change in the composite stepped-wave output voltage when the instantaneous composite output voltage substantially equals a value related to the control band limits.

2. A circuit according to claim 1 wherein all of said inverter modules are identical and have individual output voltages of equal magnitude with positive and negative polarity, and
    said logic means derives gating signals to change the output of one or more inverter modules when the instantaneous composite output voltage substantially equals at least one control band limit.

3. A circuit according to claim 1 wherein said inverter modules are unequal and include a plurality of identical inverter modules that have individual output voltages of equal magnitude with positive and negative polarity, and at least one inverter module that has individual output voltages of equal magnitude and opposite polarity that are a multiple of the individual output voltages of the identical modules, and wherein
    said logic means derives gating signals to change the output of one or more inverter modules when the instantaneous composite output voltage substantially equals at least one control band limit.

4. A circuit according to claim 2 wherein each of said inverter modules has a third discrete output voltage of 0 volts.

5. A circuit according to claim 2 wherein the magnitude of the total voltage between the two control band limits is approximately equal to the magnitude of the individual output voltages of the identical inverter modules.

6. A circuit according to claim 1 wherein said control band limits are symmetrical about the reference signal and each differs from the instantaneous reference signal by a constant value, and
    said logic means derives gating signals to change the output of one or more inverter modules when the instantaneous composite output voltage departs from the range between the two control band limits.

7. A circuit according to claim 1 wherein all of said inverter modules have individual output voltages of equal magnitude, or an integer multiple thereof, and opposite polarity, said control band limits are symmetrical about the reference signal and each differs from the instantaneous reference signal by a constant voltage, and said logic means derives gating signals to change the output of one or more inverter modules when the instantaneous composite output voltage is substantially equal to either control band limit voltage.

8. A circuit according to claim 1 wherein all of said inverter modules have individual output voltages of equal magnitude, or an integer multiple thereof, and opposite polarity, and said connecting means directly connects the output terminals of said inverter modules in series with one another.

9. A circuit according to claim 1 wherein all of said inverter modules have individual output voltages of equal magnitude, or an integer multiple thereof, and opposite polarity, and said connecting means connects together the input power terminals of said inverter modules in parallel with one another, and further including output transformer means comprising an output transformer for each inverter module including a primary winding coupled between the output terminals of each module, the secondary windings of said output transformers being connected together in series.

10. A fast response stepped-wave power amplifier circuit for amplifying a variable input electrical reference signal comprising a plurality of solid state inverter modules each including at least a pair of solid state switching devices controlled to provide at least two different output voltages of equal magnitude and opposite polarity, means for connecting together said inverter modules as a stepped-wave inverter so that the composite stepped-wave output voltage is the algebraic sum of the individual module output voltages, and control and logic means for selectively switching said inverter modules to produce the composite output voltage as a stepped-wave reproduction of the input reference signal, wherein said control and logic means comprises means for generating control band limits that are effectively arranged about the reference signal and have instantaneous voltage values such that the differences between the instantaneous reference signal and each control band limit have respectively constant predetermined voltage magnitudes, means for comparing a signal that is a function of the instantaneous output voltage with each control band limit, and logic means for deriving gating signals for the solid state switching devices in said inverter modules to change the individual output voltage of at least one inverter module and produce a step change in the composite output voltage when the signal that is a function of the instantaneous output voltage substantially equals at least one control band limit.

11. A circuit according to claim 10 wherein said solid state inverter modules are bridge inverter modules having two pairs of solid state switching devices arranged as a bridge circuit to provide an additional output voltage of 0 volts, all of said inverter modules being identical with the exception of at least one module having individual output voltages that are an integer multiple of the individual output voltages of the identical modules, and wherein said connecting means directly connects the output terminals of said inverter modules in series with one another.

12. A circuit according to claim 11 wherein said means for comparing the signal that is a function of the instantaneous composite output voltage with each control band limit comprises a summing circuit for continuously deriving the error voltage between the instantaneous reference signal and the stepped-wave output voltage, and an analog-to-digital compare and conversion circuit for comparing the error voltage with each control band limit and determining the information required to produce the proper change in composite output voltage.

13. A method for controlling a stepped-wave inverter circuit comprising a plurality of inverter modules each having at least two output voltages of equal magnitude and opposite polarity, means for connecting together said inverter modules as a stepped-wave inverter so that the composite stepped-wave output voltage is the algebraic sum of the individual module output voltages, and control and logic means for selectively switching said modules to produce the desired composite output voltage, comprising the steps of generating control band limit signals effectively arranged about the reference signal that have instantaneous values such that the differences between the instantaneous reference signal and each control band limit signal have predetermined magnitudes, continuously comparing a signal that is a function of the instantaneous composite stepped-wave output voltage with the control band limit signals, and switching at least one inverter module from one individual output voltage to another output voltage to produce a step change in the composite stepped-wave output voltage when the signal that is a function of the instantaneous composite output voltage substantially equals a value related to the control band limit signals.

14. The method according to claim 13 wherein the switching of at least one inverter module occurs when the signal that is a function of the instantaneous composite output voltage substantially equals either one of the control band limit signals.

15. The method according to claim 13 wherein the switching of at least one inverter module occurs when the signal that is a function of the instantaneous composite output voltage substantially equals one of the control band limit signals depending on the slope of the reference signal.

16. The method according to claim 14 wherein said control band limit signals and said reference signal are voltage signals.

17. The method according to claim 13 wherein the signal that is a function of the instantaneous stepped-wave output voltage is compared with the control band limit signals by the steps of deriving an indication of the instantaneous stepped-wave output voltage, obtaining the error voltage between the instantaneous reference signal and the indication of the instantaneous output voltage, comparing the error voltage with the control band limit signals and generating a compare output when the error voltage substantially equals either control band limit signal, and utilizing the compare outputs in an analog-to-digital conversion circuit to determine the information required to switch the inverter modules.

18. The method according to claim 13 wherein the signal that is a function of the instantaneous stepped-wave output voltage is compared with the control band limit signals by the steps of deriving an indication of the instantaneous output current in the form of a voltage signal proportional to the output current, obtaining the error voltage between the instantaneous reference signal and the indication of the instantaneous output current, comparing the error voltage with the control band limit signals and generating a compare output when the error voltage substantially equals either control band limit, and utilizing the compare outputs in an analog-to-digital conversion circuit to determine the information required to switch the inverter modules.